US007000900B1

(12) United States Patent
McKenney et al.

(10) Patent No.: US 7,000,900 B1
(45) Date of Patent: Feb. 21, 2006

(54) HYDRAULICALLY POWERED REEL LIFT

(75) Inventors: Robert D. McKenney, Easley, SC (US); Francis Stewart, Travelers Rest, SC (US); Terry Hawkins, Travelers Rest, SC (US)

(73) Assignee: Robert D. McKinney, Easley, SC (US)

( * ) Notice: Subject to any disclaimer, the term of this patent is extended or adjusted under 35 U.S.C. 154(b) by 138 days.

(21) Appl. No.: 10/754,974

(22) Filed: Jan. 9, 2004

(51) Int. Cl.
*B60P 1/48* (2006.01)

(52) U.S. Cl. ............................... 254/93 R; 254/133 R; 254/134; 254/124

(58) Field of Classification Search .............. 254/10 B, 254/10 R, 124, 93 R, 93 H, 100, 133 R, 254/134, DIG. 1, DIG. 3, DIG. 4
See application file for complete search history.

(56) References Cited

U.S. PATENT DOCUMENTS 3,298,667 A * 1/1967 Grantham et al. .......... 254/100
3,325,120 A 6/1967 Brinkman
3,702,139 A 11/1972 Chaffin
3,944,094 A 3/1976 Compton
4,030,704 A 6/1977 Beierle et al.
4,098,468 A 7/1978 Skalleberg
4,127,241 A 11/1978 Conti
4,433,816 A 2/1984 Rousseau
4,447,012 A 5/1984 Woodruff
4,475,695 A 10/1984 Franks
4,593,883 A 6/1986 Nelson
4,679,743 A 7/1987 Dallmaier
4,773,609 A 9/1988 Steffen et al.
4,944,472 A 7/1990 Stahl
4,979,723 A * 12/1990 Wittersheim ................ 254/124
5,088,654 A 2/1992 Cielker
5,297,919 A 3/1994 Reichental et al.
5,688,098 A 11/1997 Theno
5,775,621 A 7/1998 Sauber
5,806,787 A 9/1998 Schnieder
5,941,396 A 8/1999 Le Vert
5,947,407 A 9/1999 Quigley
6,086,311 A 7/2000 Campbell

* cited by examiner

*Primary Examiner*—Robert C. Watson
(74) *Attorney, Agent, or Firm*—Dority & Manning, P.A.

(57) ABSTRACT

A portable reel jack for supporting and lifting large spools of heavy cable, wire and the like includes a hydraulic lift with an extendable piston rod. A stanchion that is pivotally connected to the piston rod carries a spool support and remains vertically oriented during movement of the piston rod relative to the cylinder. Moreover, when the piston rod moves vertically away from the base in a lifting motion, then the stanchion moves laterally away from the hydraulic cylinder. As the spool is being lifted off of the ground by the hydraulic jack, the load-bearing location of the rod that carries the spool moves increasingly farther away from where the operator is standing to operate the lifting action of the portable reel jack. Additionally, the spool support has the flexibility of three different height elevations for carrying the rod on which the spool is in turn carried. This three-tiered configuration permits the operator to select the lowest possible support position for the rod and thus enables the vertical movement of the jack's piston rod to be minimized for a spool of any given circumference.

20 Claims, 3 Drawing Sheets

HYDRAULICALLY POWERED REEL LIFT

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to heavy duty lifting equipment and in particular to portable, hydraulically powered, reel jacks.

Various types of flexible cable and wire are supplied by being wrapped around large, heavy wooden spools or reels that have a central opening. When these spools or reels arrive at the job site filled with cable or sire to be consumed at the site, they may be rested on their circular edges on the ground or floor. In order to facilitate unwinding of the cable or wire from the reel or spool, the reel or spool desirably must be lifted off the ground or floor and rotatably carried on a rigid axle that allows the reel or spool to rotate as the cable or wire is pulled from the reel or spool. Thus, it is necessary for the workers to insert an axle through the central opening of the reel or spool. Opposite ends of the axle must be carried by a lifting mechanism that enables the axle to be elevated enough so that the reel or spool no longer touches the ground or floor and is free to rotate about the axle.

The reel or spool is a heavy object that becomes unstable when lifted off the ground or floor and thus poses a danger to the workers in the area. Many of the lifting mechanisms provide the lifting force in direct vertical alignment with the axis of rotation of the axle on which the reel or spool is carried. Because the workers operating the lifting mechanism must tend to stand alongside the lifting mechanism during its lifting and lowering operations, the workers may be struck if the axle becomes dislodged. Moreover, differently sized spools and reels require the height of the axle above the ground to be different in order to raise the reel or spool off the ground. Desirably, the lifting mechanism should move as little vertically as possible in order to effectuate the lifting of the reel or spool above the ground. In this way, the potential energy is minimized in the event of dislodgement of the axle and the extension of the lifting member also is minimized so that the stability of the lifting member is maximized.

OBJECTS AND SUMMARY OF THE INVENTION

It is a principal object of the present invention to provide an improved portable reel jack with advantages in one or more of operation, safety, and cost of manufacture.

It is another principal object of the present invention to provide a portable reel jack with a lower center of gravity for enhanced stability.

It is a still further principal object of the present invention to provide a portable reel jack with multiple supports, each support disposed at a different relative height.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a portable reel jack for supporting and lifting large spools of heavy cable, wire and the like comprises a base member having a flat bottom. The portable reel jack includes a hydraulic lift that in turn includes a hydraulic cylinder that has a piston chamber and a piston disposed in the chamber. The hydraulic cylinder also includes a hydraulic reservoir, release valve and a hydraulic pump that are connected in selective communication with the piston chamber. The hydraulic cylinder defines a base that is connected to the base member. The hydraulic lift also includes a piston rod that has one end connected to the piston and an opposite end extending from the hydraulic cylinder opposite the base of the hydraulic cylinder and configured to move out of and returned into the cylinder in a vertical direction as the hydraulic fluid is pumped respectively into or released from the piston chamber.

The portable reel jack also desirably includes a rigid upright member that has opposed first and second ends. The first end of the upright member desirably is pivotally connected to the base member. A stanchion desirably is provided and defines a support end and a lower end that is disposed opposite the support end. The stanchion also includes an intermediate portion located between the support end and the lower end.

A pair of rigid scissor bars also are included as part of the portable reel jack. A first scissor bar desirably has opposed ends and an intermediate portion located between the ends. The intermediate portion of the first scissor bar desirably is pivotally connected to the piston rod. A first one of the ends of the first scissor bar desirably is pivotally connected to the second end of the upright member. The second end of the first scissor bar desirably is pivotally connected to the intermediate portion of the stanchion. The second scissor bar desirably has a first end pivotally connected to the second end of the upright member at a location that is spaced apart from where the first scissor bar is connected. A second end of the second scissor bar desirably is pivotally connected to the stanchion at a location that is spaced apart from where the first scissor bar is connected. In this way, the first and second scissor bars are oriented parallel to each other, and the stanchion remains vertically oriented during movement of the piston rod relative to the cylinder. Moreover, when the piston rod moves vertically away from the base in a lifting motion, then the stanchion moves laterally away from the hydraulic cylinder.

The portable reel jack further includes a spool support that defines an elongated carriage member that is configured to receive one end of a rod, which is designed to carry a spool on which cable and/or wire is wound. The spool support further defines a hollow channel that extends transversely to the direction of elongation of the carriage member and is configured to receive therein the support end of the stanchion. The spool support further desirably defines a first hook support that is disposed in alignment with the channel and beneath the carriage member. The first hook support is also configured to receive one end of a rod that is designed to carry a spool. Desirably, the spool support further defines a second hook support that is disposed in alignment with the channel and the first hook support and beneath the first hook support. The second hook support also is desirably configured to receive one end of a rod that is designed to carry a spool.

The hydraulic pump desirably is connected between the hydraulic reservoir and the piston chamber as is conventional. A pump lever having first and second ends is also provided with the first end pivotally engaging the pump. The pump lever extends radially from the hydraulic cylinder, and a foot pedal desirably is connected to the second end of the pump lever. The operator can step on the foot pedal repeatedly to activate the pump to withdraw fluid from the hydraulic reservoir and introduce the fluid into the piston chamber so that the piston moves and the piston rod extends increasingly vertically.

A return spring desirably has one end connected to the exterior of the hydraulic cylinder and the opposite end connected to the pump lever near where the pump lever engages the pump. In this way, after the operator depresses the foot pedal, the spring returns the foot pedal to the raised position for another stroke of the pump when the operator presses down on the foot pedal.

As the piston rod moves vertically, the first and second scissor bars tend toward a more horizontal orientation as the upright pivots about the connection to the base so that the upper portion of the upright moves away from the hydraulic cylinder and piston rod. Simultaneous with this movement of the scissor bars and upright, the stanchion that carries the spool support moves vertically higher and away from the base while at the same time moving in an arcuate direction so that the position of the stanchion also moves laterally farther away from the hydraulic cylinder, which is aligned with the foot pedal and the foot and leg of the operator. In this way, as the spool is being lifted off of the ground by the hydraulic jack, the load-bearing location of the rod that carries the spool moves increasingly farther away from where the operator is standing to operate the lifting action of the portable reel jack of the present invention.

Additionally, the spool support has the flexibility of three different height elevations for carrying the rod on which the spool is in turn carried. This three-tiered configuration permits the operator to select the lowest possible support position for the rod and thus enables the vertical movement of the jack's piston rod to be minimized for a spool of any given circumference.

Desirably, a conventional release valve is provided in the hydraulic cylinder and configured to selectively return hydraulic fluid from the piston chamber to the hydraulic fluid reservoir. A first end of a release valve lever is desirably pivotally engaged to the release valve. The release valve lever extends radially from the hydraulic cylinder, and a foot pedal is connected to the second end of the release valve lever. In this way, the operator can depress the pedal on the second end of the release valve lever to operate the release valve and lower the height of the piston and with it the height of the spool support.

Desirably, a pair of handles is provided to facilitate operator movement of the reel jack. One handle desirably is connected to the upper end of the upright member. A second handle desirably is connected to the base and spaced apart from the cylinder and thus from the handle on the upper end of the upright member.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
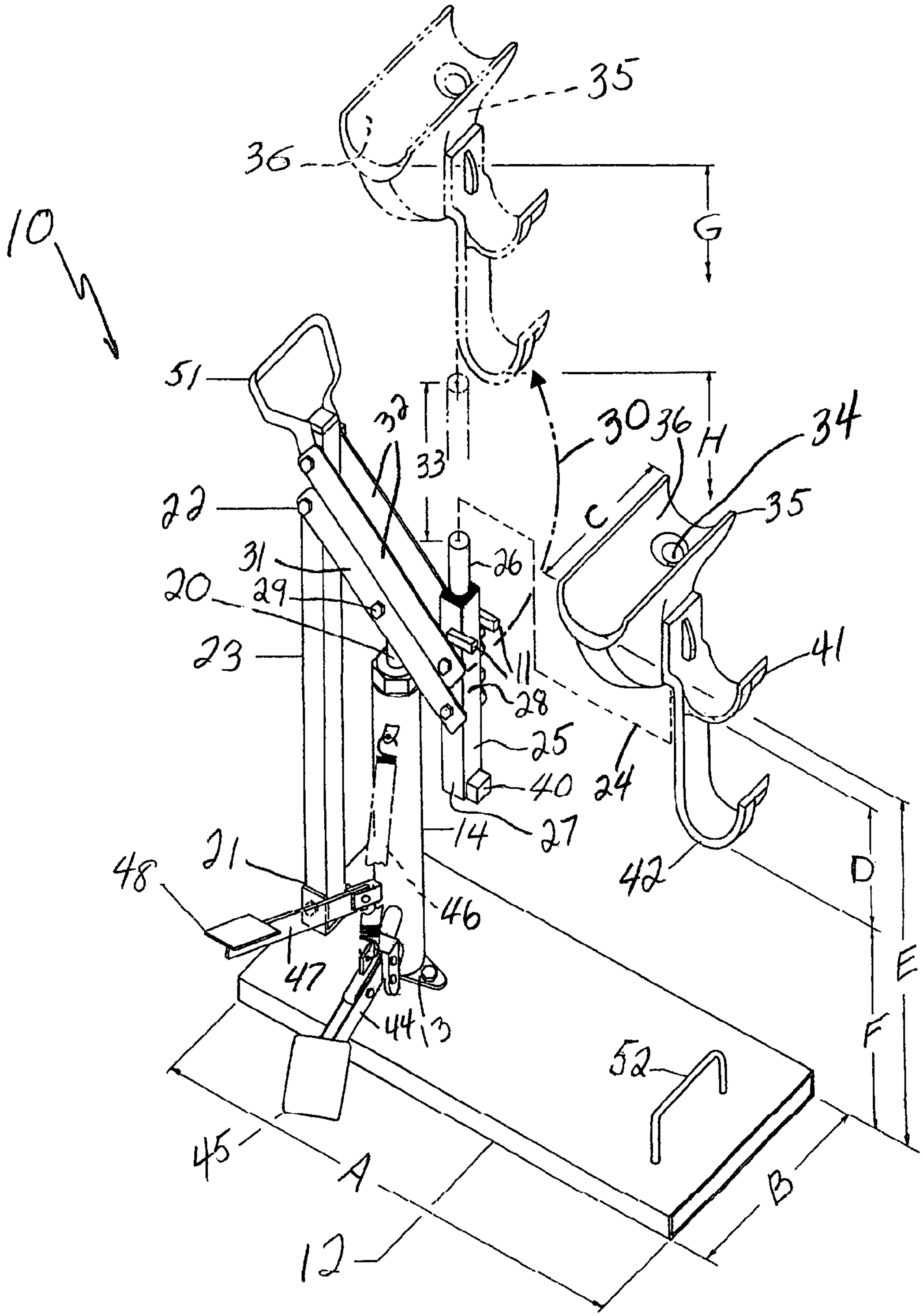
FIG. 1 is an elevated perspective view of a presently preferred embodiment of the invention with some components shown in phantom (chain dashed line) to schematically illustrate alternative configurations.

A presently preferred embodiment of the portable reel jack for supporting and lifting large spools of heavy cable, wire and the like is shown in FIG. 1 and is represented generally by the numeral 10. As shown in FIG. 1, the portable reel jack 10 comprises a base member 12 having a flat bottom for resting in a stable position on the floor. As schematically shown in FIG. 1, by the arrows designated "A" and "B," the respective length and width of a presently preferred embodiment of base member 12 is about twenty-three (23) inches and nine and one quarter (9.25) inches.

As shown in FIG. 1, the portable reel jack 10 also includes a hydraulic lift that in turn includes a hydraulic cylinder 14. As shown schematically in FIG. 3 for example, hydraulic cylinder 14 has a piston chamber 15 and a piston 16 disposed in the chamber 15. As shown schematically in FIG. 3 for example, the hydraulic cylinder 14 also includes a hydraulic reservoir 17, release valve 18 and a hydraulic pump 19 that are connected in selective communication with the piston chamber 15. The hydraulic cylinder 14 defines a base 13 that is connected to the base member 12. The hydraulic lift also includes a piston rod 20 that has one end connected to the piston 16 and an opposite end extending from the hydraulic cylinder 14 opposite the base 13 of the hydraulic cylinder 14 and configured to move out of and returned into the cylinder 14 in a vertical direction as the hydraulic fluid is pumped respectively into or released from the piston chamber 15.

As shown in FIG. 1 for example, the portable reel jack 10 also desirably includes a rigid upright member 23 that has a first end 21 that is opposed to a second end 22. The first end 21 of the upright member 23 desirably is pivotally connected to the base member 12. A stanchion 25 desirably is provided and defines a support end 26 and a lower end 27 that is disposed opposite the support end 26. The stanchion 25 also includes an intermediate portion 28 located between the support end 26 and the lower end 27. in a presently preferred embodiment of the support end 26 of the stanchion 25, the diameter of the support end 26 is about one inch.

As shown in FIG. 1, two pairs of rigid scissor bars 31, 32 also are included as part of the portable reel jack 10. Each of a first pair of scissor bars 31 desirably has opposed ends and an intermediate portion located between the ends. The intermediate portion of each of the first scissor bars 31 desirably is pivotally connected to the piston rod 20 such as by a bolt 29. A first one of the ends of each of the first scissor bars 31 desirably is pivotally connected to the second end 22 of the upright member 23. The second end of each of the first scissor bars 31 desirably is pivotally connected to the intermediate portion 28 of the stanchion 25.

As shown in FIG. 1, each of the second scissor bars 32 desirably has a first end pivotally connected to the second end 22 of the upright member 23 at a location that is spaced apart from where the pair of first scissor bars 31 is connected. A second end of each of the second scissor bars 32 desirably is pivotally connected to the intermediate portion 28 of the stanchion 25 at a location that is spaced apart from where the pair of first scissor bars 31 is connected. In this way, the pair of first scissor bars 31 is oriented parallel to the pair of second scissor bars 32, and the stanchion 25 remains vertically oriented during movement of the piston rod 20 relative to the cylinder 14.

Moreover, as schematically indicated by the chain-dashed arrow designated 30 in FIG. 1, when the piston rod 20 moves vertically away from the base 13 in a lifting motion, then the stanchion 25 moves laterally away from the hydraulic cylinder 14 until the two pairs of scissor bars 31, 32 become horizontally disposed. As schematically indicated by the vertically disposed arrows designated 33 in FIG. 1, the support end 26 of the stanchion 25 moves vertically the tip-to-tip distance between the arrows 33 when the scissor bars 31, 32 move between the tilted orientation shown in FIG. 1 and a horizontal orientation (not shown). In a presently preferred embodiment of the portable reel jack 10, this vertical distance between the arrows designated 33 in FIG. 1 is about six (6) inches.

Figure 2:
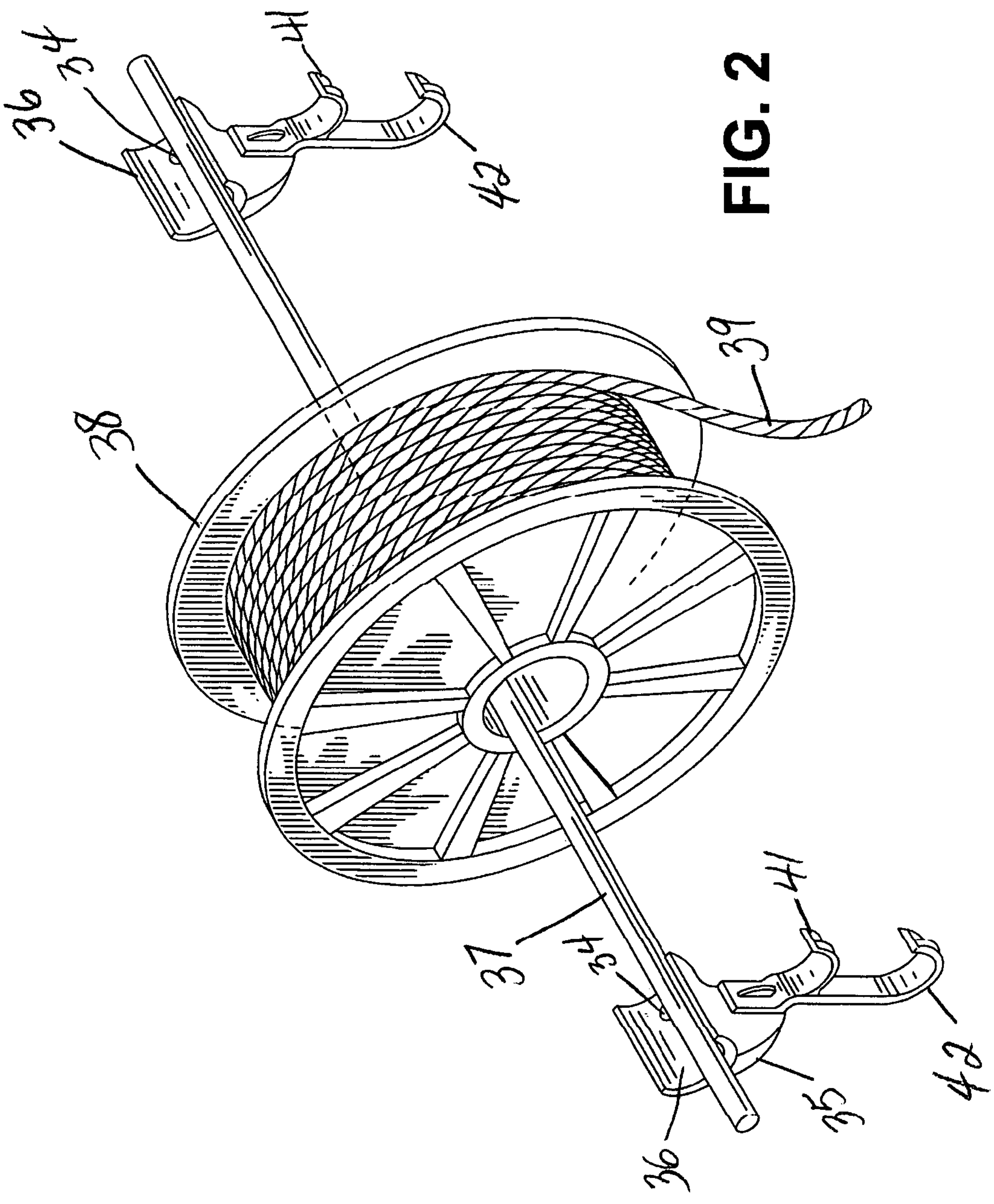
FIG. 2 is an elevated perspective view that schematically represents components of the embodiment of FIG. 1 shown in relation to a reel or spool of cable or wire.

As shown in FIGS. 1 and 2, the portable reel jack 10 further includes a spool support 35 that defines an elongated carriage member 36. As schematically shown in FIG. 1 by the arrows designated "C," the length of a presently preferred embodiment of carriage member 36 is about seven inches. The curvature of a presently preferred embodiment of the elongated carriage member 36 has a radius of about one and one-half inches. As shown FIG. 1, the spool support 35 further defines a hollow channel 34 that extends transversely to the direction of elongation of the carriage member 36. As schematically shown by the dashed line designated 24 in FIG. 1, the hollow channel 34 is configured to receive therein the support end 26 of the stanchion 25. As schematically shown in FIG. 2, the elongated carriage member 36 is configured to receive one end of a rigid rod 37, which is designed to carry a spool 38 on which wire and/or cable 39 is wound. As schematically shown in FIG. 2, two portable reel jacks 10 are provided, with one on each opposite side of the spool 38 supporting one of the opposite ends of the rod 37 in a respective spool support 35.

As shown in FIG. 1, the stanchion 25 is provided with a pair of spaced apart arm rests 11 and a lower rest 40. The arm rests 11 are disposed just below the support end 26, and the lower rest 40 extends from the lower end 27 of the stanchion 25. The arm rests 11 and the lower rest 40 are configured to engage the spool support 35 in a manner that prevents the spool support 35 from twisting when undergoing lifting load.

As shown in FIGS. 1 and 2, the spool support 35 further desirably defines a first hook support 41 that is disposed in alignment with the channel 34 and beneath the carriage member 36. The first hook support 41 is also configured to receive one end of a rod 37 that is designed to carry a spool 38. The width of a presently preferred embodiment of the first hook support 41 measured in the direction of arrows "C" in FIG. 1 is about two inches. Desirably, the spool support 35 further defines a second hook support 42 that is disposed in alignment with the channel 24 and the first hook support 41 and beneath the first hook support 41. The second hook support 42 also is desirably configured to receive one end of a rod 37 that is designed to carry a spool 38. The width of a presently preferred embodiment of the second hook support 42 measured in the direction of arrows "C" in FIG. 1 is about one and one-half inches. As schematically shown in FIG. 1 by the arrows designated "D," the lowest point of a presently preferred embodiment of the second hook support 42 is disposed about six (6) inches beneath the lowest point of a presently preferred embodiment of the first hook support 41.

As schematically shown in FIG. 1 by the arrows designated "E," when the piston rod 20 is full retracted, the height above the floor of the lowest point of a presently preferred embodiment of the carriage member 36 is about twenty-one (21) inches. Similarly, as schematically shown in FIG. 1 by the arrows designated "F," the height above the floor of the lowest point of a presently preferred embodiment of the second hook support 42 is about eight and three quarter (8.75) inches when the piston rod 20 is full retracted.

Figure 3:
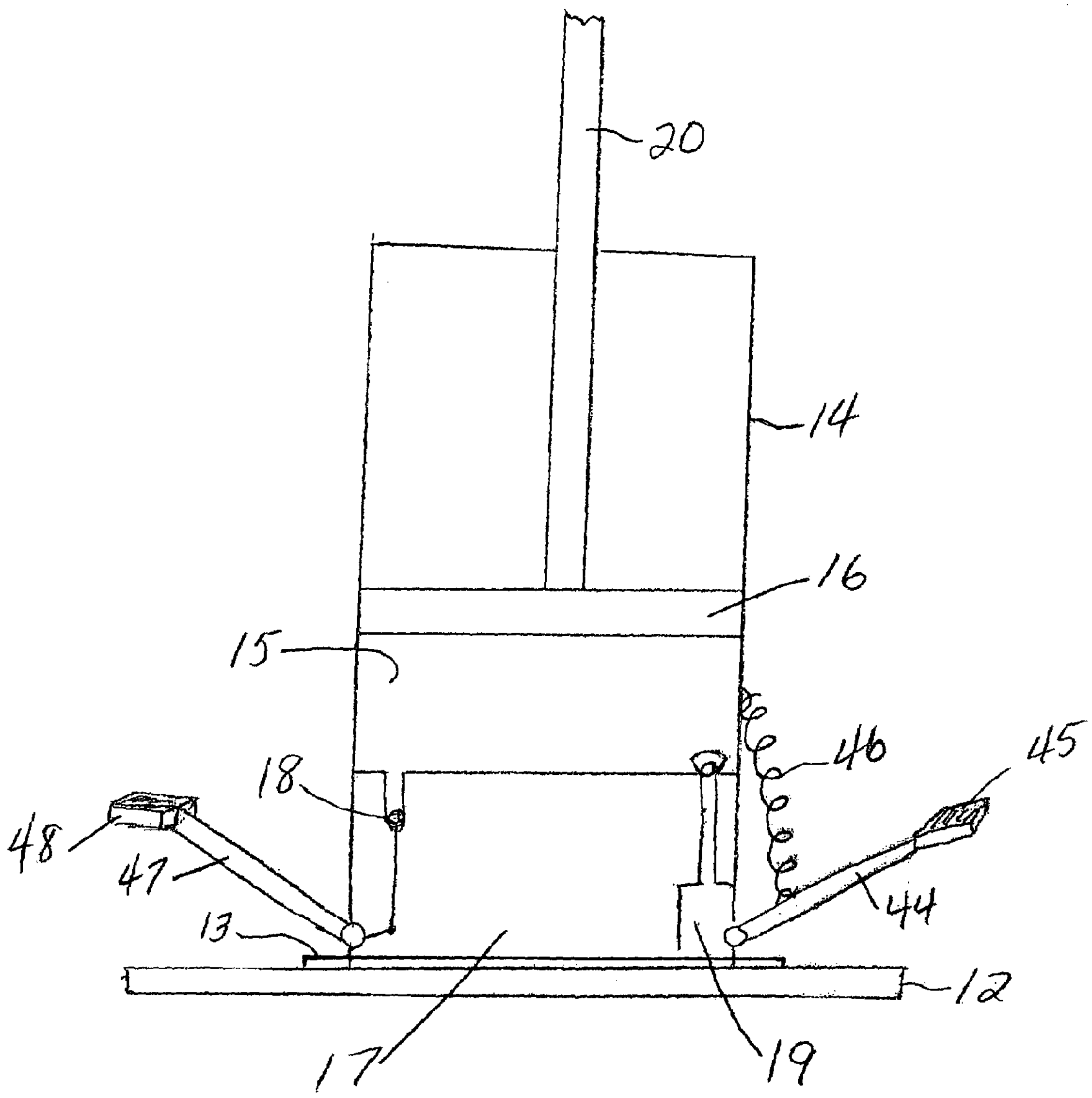
FIG. 3 is a partial cross-sectional view that schematically represents components of the embodiment of FIG. 1.

As schematically shown in FIG. 3, the hydraulic pump 19 desirably is connected between the hydraulic reservoir 17 and the piston chamber 15 as is conventional. A pump lever 44 having first and second ends is also provided with the first end pivotally engaging the pump 19. The pump lever 44 extends radially from the hydraulic cylinder 14, and a foot pedal 45 desirably is connected to the second end of the pump lever 44. The operator can step on the foot pedal 45 repeatedly to activate the pump 19 to withdraw hydraulic fluid from the hydraulic reservoir 17 and introduce the fluid into the piston chamber 15 so that the piston 16 moves and the piston rod 20 extends increasingly vertically out of the end of the hydraulic cylinder 14.

A return spring 46 desirably has one end connected to the exterior of the hydraulic cylinder 14 and the opposite end connected to the pump lever 44 near where the pump lever 44 operatively engages the pump 19. In this way, after the operator depresses the foot pedal 45, the spring 46 returns the foot pedal 45 to the raised position for another stroke of the pump 19 when the operator presses down on the foot pedal 45.

As the piston rod 20 moves vertically, the pairs of first and second scissor bars 31, 32 tend toward a more horizontal orientation as the upright 23 pivots about the connection to the base member 12 so that the upper portion of the upright 23 moves away from the hydraulic cylinder 14 and piston rod 20. Simultaneous with this movement of the pairs of scissor bars 31, 32 and upright 23, the stanchion 25 that carries the spool support 35 moves vertically higher and away from the base 13 while at the same time moving in an arcuate direction (indicated by the chain-dashed line 30) so that the position of the stanchion 25 also moves laterally farther away from the hydraulic cylinder 14, which is aligned with the foot pedal 45 and the foot and leg of the operator. In this way, as the spool 38 is being lifted off of the ground by the pair of hydraulic reel jacks 10, the load-bearing location of the rod 37 that carries the spool 38 moves increasingly farther away from where the operator is standing to operate the lifting action of the portable reel jacks 10 of the present invention. In the even of a mishap during lifting of the spool 38, the operator is less likely to be struck by the rod 37.

Moreover, when the pairs of scissor bars 31, 32 move past the horizontal orientation and tilt so that the ends connected to the stanchion 25 are elevated above the ends connected to the upright 23, then the upward vertical distance traveled by the support end 26 of the stanchion becomes greater than the upward vertical distance traveled by the piston rod 20. Thus, the pivotal arrangement of the pairs of scissor bars 31, 32 enable the piston 16 to do more work per unit of distance traveled by the piston 16 than if the rod 37 (and the load carried by the rod 37) were disposed directly in vertical alignment with the piston rod 20 and were lifted vertically directly by the piston rod 20. This mechanical advantage is a result of the configuration of the portable reel jack of the present invention.

As schematically shown in FIG. 1 by the arrows designated "G," when the piston rod 20 is full extended out of the cylinder 14, the height above the floor of the lowest point of a presently preferred embodiment of the carriage member 36 (indicated in phantom in chain-dashed line) is about thirty-four and one quarter (34.25) inches. Similarly, as schematically shown in FIG. 1 by the arrows designated "H," the height above the floor of the lowest point of a presently preferred embodiment of the second hook support 42 is about twenty-two (22) inches when the piston rod 20 is full extended out of the cylinder 14.

Additionally, as shown in FIGS. 1 and 2 for example, the spool support 35 has the flexibility of three different height elevations for carrying the rod 37 on which the spool 38 is in turn carried. This three-tiered configuration permits the operator to select the lowest possible support position for the rod 37 and thus enables the vertical movement of the jack's piston rod 20 to be minimized for a spool 38 of any given circumference.

Desirably, as schematically shown in FIG. 3, a conventional release valve 18 is provided in the hydraulic cylinder 14 and configured to selectively return hydraulic fluid from the piston chamber 15 to the hydraulic fluid reservoir 17. A first end of a release valve lever 47 is desirably pivotally engaged to the release valve 18. The release valve lever 47 extends radially from the hydraulic cylinder 14, and a foot pedal 48 is connected to the second end of the release valve lever 47. In this way, the operator can depress the pedal 48 on the second end of the release valve lever 47 to operate the release valve 18 and lower the height of the piston 16 and with it the height of the spool support 35.

Desirably, a pair of handles is provided to facilitate operator movement of the reel jack. As shown in FIG. 1, a first handle 51 desirably is connected to the upper end of the upright member 23. A second handle 52 desirably is connected to the base member 12 and spaced apart from the cylinder 14 and thus from the first handle 51 on the upper end of the upright member 23.

While at least one presently preferred embodiment of the invention has been described using specific terms, such description is for illustrative purposes only, and it is to be understood that changes and variations may be made without departing from the spirit or scope of the following claims.

What is claimed is:

1. A portable reel jack for supporting and lifting large spools of heavy cable, wire and the like, comprising:

a base member;

a hydraulic lift including a hydraulic cylinder having a base connected to said base member, said lift further including a piston rod extending from said hydraulic cylinder opposite said base of said hydraulic cylinder and configured to move into and out of said cylinder in a vertical direction;

a rigid upright member having opposed first and second ends, said first end being pivotally connected to said base member;

a rigid first scissor bar having opposed ends and an intermediate portion located between said ends of said scissor bar, said intermediate portion being pivotally connected to said piston rod, a first one of said ends of said scissor bar being pivotally connected to said second end of said upright member;

a stanchion defining a free end, a support end opposite said free end and an intermediate portion located between said free end and said support end, said intermediate portion of said stanchion being pivotally connected to a second one of said opposed ends of said first scissor bar;

a rigid second scissor bar having opposed ends, a first one of said opposed ends of said second scissor bar being pivotally connected to said second end of said upright member at a location spaced apart from where said first scissor bar is connected, a second one of said opposed ends of said second scissor bar being pivotally connected to said stanchion at a location spaced apart from where said first scissor bar is connected so that said first and second scissor bars are oriented parallel to each other and said stanchion remains vertically oriented during movement of said piston rod relative to said cylinder;

a spool support defining an elongated carriage member that is configured to receive one end of a rod carrying a spool, said spool support defining a hollow channel extending transversely to said direction of elongation of said carriage member and receiving therein said free end of said stanchion.

2. An apparatus as in claim 1, further comprising:

a first hook support disposed in alignment with said channel of said spool support and beneath said carriage member and configured to receive one end of a rod carrying a spool, said spool support defining a second hook support disposed in alignment with said channel and beneath said first hook support and configured to receive one end of a rod carrying a spool.

3. An apparatus as in claim 2, further comprising:

a second hook support disposed in alignment with said channel of said spool support and beneath said first hook support and configured to receive one end of a rod carrying a spool.

4. An apparatus as in claim 1, further comprising:

a piston chamber forming part of said hydraulic cylinder and disposed therein;

a hydraulic reservoir forming part of said hydraulic cylinder and disposed therein;

a pump connected between said hydraulic reservoir and said piston chamber;

a pump lever having first and second ends, said first end pivotally engaging said pump and said pump lever extending radially from said hydraulic cylinder; and a foot pedal connected to said second end of said pump lever.

5. An apparatus as in claim 4, further comprising:

a return spring having one end connected to said hydraulic cylinder and an opposite end connected to said pump lever.

6. An apparatus as in claim 1, further comprising:

a piston chamber forming part of said hydraulic cylinder and disposed therein;

a hydraulic reservoir forming part of said hydraulic cylinder and disposed therein;

a release valve included in said hydraulic cylinder and configured to selectively return hydraulic fluid from said piston chamber to said hydraulic fluid reservoir;

a release valve lever having first and second ends, said first end pivotally engaging said release valve and said lever extending radially from said hydraulic cylinder; and a foot pedal connected to said second end of said release valve lever.

7. An apparatus as in claim 1, further comprising:

a handle connected to said second end of said upright member.

8. An apparatus as in claim 1, further comprising:

a handle connected to said base member and disposed apart from said hydraulic lifting member.

9. A portable reel jack for supporting and lifting large spools of heavy cable, wire and the like, comprising:

a base member;

a hydraulic lift including a hydraulic cylinder having a base connected to said base member, said lift further including a piston rod extending from said hydraulic cylinder opposite said base of said hydraulic cylinder and configured to move into and out of said cylinder in a vertical direction;

a stanchion defining a free end, a support end opposite said free end and an intermediate portion located between said free end and said support end, said intermediate portion of said stanchion being pivotally connected to said piston rod via a first scissor member so that said stanchion remains vertically oriented during movement of said piston rod relative to said cylinder;

a spool support defining an elongated carriage member that is configured to receive one end of a rod carrying a spool, said spool support defining a hollow channel extending transversely to said direction of elongation of said carriage member and receiving therein said free end of said stanchion; and a first hook support disposed in alignment with said channel of said spool support and beneath said carriage member and configured to receive one end of a rod carrying a spool, said spool support defining a second hook support disposed in alignment with said channel and beneath said first hook support and configured to receive one end of a rod carrying a spool.

10. An apparatus as in claim 9, further comprising:

a second hook support disposed in alignment with said channel of said spool support and beneath said first hook support and configured to receive one end of a rod carrying a spool.

11. An apparatus as in claim 9, further comprising:

a piston chamber forming part of said hydraulic cylinder and disposed therein;

a hydraulic reservoir forming part of said hydraulic cylinder and disposed therein;

a pump connected between said hydraulic reservoir and said piston chamber;

a pump lever having first and second ends, said first end pivotally engaging said pump and said pump lever extending radially from said hydraulic cylinder; and a foot pedal connected to said second end of said pump lever.

12. An apparatus as in claim 11, further comprising:

a return spring having one end connected to said hydraulic cylinder and an opposite end connected to said pump lever.

13. An apparatus as in claim 9, further comprising:

a piston chamber forming part of said hydraulic cylinder and disposed therein;

a hydraulic reservoir forming part of said hydraulic cylinder and disposed therein;

a release valve included in said hydraulic cylinder and configured to selectively return hydraulic fluid from said piston chamber to said hydraulic fluid reservoir;

a release valve lever having first and second ends, said first end pivotally engaging said release valve and said lever extending radially from said hydraulic cylinder; and a foot pedal connected to said second end of said release valve lever.

14. An apparatus as in claim 9, further comprising:

a handle connected to said second end of said upright member.

15. An apparatus as in claim 9, further comprising:

a handle connected to said base member and disposed apart from said hydraulic lifting member.

16. A portable reel jack for supporting and lifting large spools of heavy cable, wire and the like, comprising:

a base member having a flat bottom;

a hydraulic lift including a hydraulic cylinder having a piston chamber, a piston disposed in said chamber, a hydraulic reservoir, a pump and a base, said base being connected to said base member, said lift further including a piston rod having one end connected to said piston and an opposite end extending from said hydraulic cylinder opposite said base of said hydraulic cylinder and configured to move into and out of said cylinder in a vertical direction;

a rigid upright member having opposed first and second ends, said first end being pivotally connected to said base member;

a rigid first scissor bar having opposed ends and an intermediate portion located between said ends of said scissor bar, said intermediate portion being pivotally connected to said piston rod, a first one of said ends of said scissor bar being pivotally connected to said second end of said upright member;

a stanchion defining a free end and a support end opposite said free end and an intermediate portion located between said free end and said support end, said intermediate portion of said stanchion being pivotally connected to a second one of said opposed ends of said first scissor bar;

a rigid second scissor bar having opposed ends, a first one of said opposed ends of said second scissor bar being pivotally connected to said second end of said upright member at a location spaced apart from where said first scissor bar is connected, a second one of said opposed ends of said second scissor bar being pivotally connected to said stanchion at a location spaced apart from where said first scissor bar is connected so that said first and second scissor bars are oriented parallel to each other and said stanchion remains vertically oriented during movement of said piston relative to said cylinder;

a spool support defining an elongated carriage member that is configured to receive one end of a rod carrying a spool, said spool support defining a hollow channel extending transversely to said direction of elongation of said carriage member and receiving therein said free end of said stanchion, said spool support further defining a first hook support disposed in alignment with said channel and beneath said carriage member and configured to receive one end of a rod carrying a spool, said spool support defining a second hook support disposed in alignment with said channel and beneath said first hook support and configured to receive one end of a rod carrying a spool.

17. An apparatus as in claim 16, further comprising:

a piston chamber forming part of said hydraulic cylinder and disposed therein;

a hydraulic reservoir forming part of said hydraulic cylinder and disposed therein;

a pump connected between said hydraulic reservoir and said piston chamber;

a pump lever having first and second ends, said first end pivotally engaging said pump and said pump lever extending radially from said hydraulic cylinder; and a foot pedal connected to said second end of said pump lever.

18. An apparatus as in claim 17, further comprising:

a return spring having one end connected to said hydraulic cylinder and an opposite end connected to said pump lever.

19. An apparatus as in claim 16, further comprising:

a piston chamber forming part of said hydraulic cylinder and disposed therein;

a hydraulic reservoir forming part of said hydraulic cylinder and disposed therein;

a release valve included in said hydraulic cylinder and configured to selectively return hydraulic fluid from said piston chamber to said hydraulic fluid reservoir;

a release valve lever having first and second ends, said first end pivotally engaging said release valve and said lever extending radially from said hydraulic cylinder; and a foot pedal connected to said second end of said release valve lever.

20. An apparatus as in claim 16, further comprising:

a first handle connected to said second end of said upright member; and a second handle connected to said base member and disposed apart from said hydraulic lifting member.

* * * * *